US007569761B1

(12) United States Patent
Iampietro et al.

(10) Patent No.: US 7,569,761 B1
(45) Date of Patent: Aug. 4, 2009

(54) VIDEO EDITING MATCHED TO MUSICAL BEATS

(75) Inventors: Michael Iampietro, San Francisco, CA (US); P B Ramesh, Uttar Pradesh (IN); Abhinav Darbari, Uttar Pradesh (IN)

(73) Assignee: Adobe Systems Inc., San Jose, CA (US)

( * ) Notice: Subject to any disclaimer, the term of this patent is extended or adjusted under 35 U.S.C. 154(b) by 0 days.

(21) Appl. No.: 11/859,141

(22) Filed: Sep. 21, 2007

(51) Int. Cl.
    *G10H 1/00* (2006.01)
(52) U.S. Cl. .......................................... 84/600; 84/601
(58) Field of Classification Search ............ 84/600–602
    See application file for complete search history.

(56) References Cited

U.S. PATENT DOCUMENTS

| 5,675,557 A * | 10/1997 | Hubinger ........................ 369/4 |
| 6,639,649 B2 * | 10/2003 | Fredlund et al. ............... 352/12 |
| 6,686,970 B1 * | 2/2004 | Windle ........................ 348/584 |
| 7,026,536 B2 * | 4/2006 | Lu et al. ........................ 84/612 |
| 7,301,092 B1 * | 11/2007 | McNally et al. ............... 84/612 |
| 2002/0148347 A1 * | 10/2002 | Herberger et al. ............. 84/636 |
| 2003/0025878 A1 * | 2/2003 | Fredlund et al. ............... 352/1 |
| 2005/0070241 A1 * | 3/2005 | Northcutt et al. ............. 455/265 |
| 2005/0217462 A1 * | 10/2005 | Thomson et al. .............. 84/612 |
| 2008/0034947 A1 * | 2/2008 | Sumita ........................ 84/613 |
| 2008/0034948 A1 * | 2/2008 | Sumita ........................ 84/636 |
| 2008/0115656 A1 * | 5/2008 | Sumita ........................ 84/612 |

\* cited by examiner

*Primary Examiner*—David S. Warren
(74) *Attorney, Agent, or Firm*—Chapin IP Law, LLC

(57) ABSTRACT

Methods and apparatus provide for a clip-beat aligner that identifies musical beats in an audio file. An editing mode is provided to associate the audio file with a media segment according to a timeline. The clip-beat aligner aligns a boundary of the media segment with a musical beat on the timeline. Upon performing an editing operation, the clip-beat aligner maintains that the boundary of the media segment is aligned with any one of the musical beats. To align a boundary of each media segment with a musical beat, the clip-beat aligner identifies a musical beat that is proximate to the position of the media segment's boundary. The clip-beat aligner then aligns the media segment's boundary with the proximate musical beat by, if necessary, automatically trimming the media segment's duration such that the media segment's boundary occurs at the same moment in time as the proximate musical beat.

18 Claims, 10 Drawing Sheets

310 ALIGN THE BOUNDARY OF THE MEDIA SEGMENT WITH ONE OF THE MUSICAL BEATS.

320 WHERE THE MEDIA SEGMENT COMPRISES ONE OF A VIDEO CLIP AND AN IMAGE STILL, IDENTIFY A PROXIMATE MUSICAL BEAT, FROM THE IDENTIFIED MUSICAL BEATS, THAT IS CLOSEST TO A POSITION OF THE BOUNDARY OF THE MEDIA SEGMENT ON THE TIMELINE, THE BOUNDARY OF THE MEDIA SEGMENT DEFINING AN END OF THE MEDIA SEGMENT.

330 MEASURE THE PROXIMATE MUSICAL BEAT FROM ONE OF:
(i) AN INITIAL BEAT OF THE AUDIO FILE,
(ii) A PRECEDING MUSICAL BEAT THAT IS ALIGNED WITH A BOUNDARY OF ANOTHER MEDIA SEGMENT THAT OCCURS JUST PRIOR TO THE MEDIA SEGMENT,
(iii) A POSITION OF A BEGINNING OF THE MEDIA SEGMENT ON THE TIMELINE.

340 ALIGN THE BOUNDARY OF THE MEDIA SEGMENT TO THE PROXIMATE MUSICAL BEAT BY AUTOMATICALLY TRIMMING A DURATION OF THE MEDIA SEGMENT SUCH THAT A TRIMMED DURATION OF THE MEDIA SEGMENT RESULTS IN THE BOUNDARY OF THE MEDIA SEGMENT OCCURRING SIMULTANEOUSLY WITH THE PROXIMATE MUSICAL BEAT.

VIDEO EDITING MATCHED TO MUSICAL BEATS

BACKGROUND

Conventional video editing software applications enable users to edit, manage and create various types of video media content for personal and/or professional purposes. Based on use of such applications, digital videos, images and sounds may be modified and combined in conventional video editing software to produce a desired multi-media effect.

Typically, a user can access various types of digital content on a local computer using a corresponding graphical user interface (e.g., including menus, icons, toolbar functions, etc.) associated with an executed video editing software application. In such a context, as mentioned above, the video editing software typically enables users to add graphics (e.g., superimpose captions, titles, etc.) and effects to the edited video media content. Such effects may include features such as a black and white mode, blurring of images and video frames, transition schemes for transitioning between video clips, and/or similar methods suitable for producing creative digital video content.

SUMMARY

Conventional applications that provide video editing functionality suffer from a variety of deficiencies. For example, when video editors desire to enhance their edited video(s) with music, most conventional applications require manually aligning video clips to the musical beats that is to accompany the video project. Such manual alignment burdens video editors as it is a very time consuming task. First, the video editors need to locate the beats in the audio, then they must arrange all their clips such that they fit exactly between beats or at the same moment in time that the desired beats occur. At a later stage in the video editing process, as video clips are removed or added, the whole manual alignment process has to be repeated to get all the clips realigned.

Embodiments disclosed herein can significantly overcome such deficiencies and/or other deficiencies in the prior art. The embodiments herein provide for a clip-beat aligner that detects beats in an audio file (e.g. music beats) and automatically trims (or expands) media segment boundaries in order to align the boundaries of each media segment to a beat. Thus, as editing operations are executed, the clip-beat aligner can continually trim and retrim the media segment (e.g. video clip, image still) boundaries to ensure that the boundaries are always aligned to beats in the music. Moreover, the clip-beat aligner does not require that media segment boundaries maintain an alignment with a particular musical beat throughout the entire editing process. Although, the clip-beat aligner can provide for an editing mode which allows for a clip boundary to be permanently aligned with a specific musical beat.

According to one embodiment of the clip-beat aligner, musical beats are identified in the audio file whenever there is a strong decibel rise in a short duration of time. In other words, a beat can be identified where the amplitude of the audio is a specific amount (i.e. a predefined amount) higher than the amplitude of the lowest point within a specific duration of time. The clip-beat aligner can indicate the "best" beats as those instances of sound in the audio file that have a maximum decibel rise during a fixed duration of time.

According to another embodiment of the clip-beat aligner, when any video clip is added to the video editing timeline, all the clips (including the newly added clip) will be aligned to a proximate beat. For example, where the numbers A, B, C, D represent 4 different clips and their lengths are 1, 2, 3, 4 units respectively, the beat-clip alignment can be as follows:

| BEATS | # | # |   | # |   |   | # | # | # |
|-------|---|---|---|---|---|---|---|---|---|
| CLIPS | A | B | C | C | D | D | D |   |   |

Here, video clips B, C and D have been automatically trimmed to new durations of 1, 2, and 3, respectively, in order to align with the musical beats. For the editor, this is a one step process that entails adding the video clips (A, B, C, D) onto the timeline and selecting the editing mode to have the video clips automatically trimmed to "snap" into a location on the timeline such that the video clip boundaries are in alignment with the proximate musical beats.

Were the video editor to execute additional editing operations, then the alignment of clips A, B, C, D would be affected. According to another embodiment of the clip-beat aligner, if the video editor deletes a clip from the timeline then there can be a ripple effect to automatically trim the remaining video clips in order to maintain alignment with beats. For example, before the delete operation, the timeline and beat alignment can appear as follows:

| BEATS | # | # |   | # |   |   | # | # | # |
|-------|---|---|---|---|---|---|---|---|---|
| CLIPS | A | B | C | C | D | D | D |   |   |

Next, the video editor decides to delete clip 'C', which will effect the length and beat alignment of video clip D. The final timeline and beat alignment can then appear as follows:

| BEATS | # | # |   | # |   | # | # | # |
|-------|---|---|---|---|---|---|---|---|
| CLIPS | A | B |   | D |   | D |   |   |

Here, apart from deleting clip 'C', the duration of clip 'D' is again trimmed in order to reduce D's duration from 3 units to 2 units, thereby aligning clip 'D' with the third beat.

Thus, according to general embodiments, the clip-beat aligner identifies musical beats in an audio file. An editing mode is further provided to associate the audio file with a media segment (e.g. video clip, image still) according to a timeline. The clip-beat aligner's editing mode aligns a boundary of the media segment with one of the musical beats on the timeline. Upon performing an editing operation in the editing mode, the clip-beat aligner maintains that the boundary of the media segment is aligned with any one of the musical beats.

To align a boundary of each media segment with a musical beat, the clip-beat aligner identifies a proximate musical beat, from among all musical beats in the audio file, that is closest to a position of the media segment's boundary on the timeline. The proximate musical beat can be identified by measuring from an initial beat of the audio file, a preceding musical beat that is already aligned with the boundary of another media segment, or from the beginning of that particular media segment on the timeline. Thus, the proximate beat can be a beat that is located closest to but not exceeding the maximum duration of the media segments as measured from the point at which the clip begins at (if the clip has been trimmed already the proximate beat could be further form the beginning of the clip then the currently trimmed duration of the clip). For image stills, the proximate beat can also be a beat that is located closest to a default duration that is specified for still images as measured from the point at which the still image begins.

Once the clip-beat aligner has identified the proximate musical beat, the clip-beat aligner aligns the media segment's boundary with the proximate musical beat by, if necessary, automatically trimming the media segment's duration such that the new trimmed duration results in the boundary of the media segment occurring at the same moment in time (i.e. simultaneously) on the timeline as the proximate musical beat.

Other embodiments include a computerized device, configured to process all the method operations disclosed herein as embodiments of the clip-beat aligner. In such embodiments, the computerized device includes a memory system, a processor, communications interface in an interconnection mechanism connecting these components. The memory system is encoded with a process that provides an interface with distinct interaction models as explained herein that when performed (e.g. when executing) on the processor, operates as explained herein within the computerized device to perform all of the method embodiments and operations explained herein as embodiments of the clip-beat aligner. Thus, any computerized device that performs or is programmed to perform the processing explained herein is an embodiment of the clip-beat aligner.

It is to be understood that the embodiments of the clip-beat aligner can be embodied strictly as a software program, as software and hardware, or as hardware and/or circuitry alone, such as within a data communications device. The features of the clip-beat aligner, as explained herein, may be employed in data communications devices and/or software systems for such devices such as those manufactured by Adobe Systems, Incorporated of San Jose, Calif.

Note that each of the different features, techniques, configurations, etc. discussed in this disclosure can be executed independently or in combination. Accordingly, the present clip-beat aligner can be embodied and viewed in many different ways.

Also, note that this summary section herein does not specify every embodiment and/or incrementally novel aspect of the present disclosure or claimed clip-beat aligner. Instead, this summary only provides a preliminary discussion of different embodiments and corresponding points of novelty over conventional techniques. For additional details, elements, and/or possible perspectives (permutations) of the clip-beat aligner, the reader is directed to the Detailed Description section and corresponding figures of the present disclosure as further discussed below.

BRIEF DESCRIPTION OF THE DRAWINGS

The foregoing and other objects, features and advantages of the clip-beat aligner will be apparent from the following description of particular embodiments of the clip-beat aligner, as illustrated in the accompanying drawings in which like reference characters refer to the same parts throughout the different views. The drawings are not necessarily to scale, emphasis instead being placed upon illustrating the principles of the clip-beat aligner.

FIG. 3 is a flowchart of processing steps performed by a clip-beat aligner to align media segment boundaries to musical beats according to embodiments herein.

DETAILED DESCRIPTION

Methods and apparatus provide for a clip-beat aligner with an editing mode that allows for detecting beats in music and aligning video and/or graphic clip boundaries to the detected beats as a user performs editing operations. Thus, the clip-beat aligner can maintain that video and/or image still boundaries (i.e. endpoints) are aligned to the beats in the music without requiring the user to manually manipulate the clip boundaries.

In particular, the clip-beat aligner provides an editing mode to associate the audio file with a media segment according to a timeline. The clip-beat aligner aligns a boundary of the media segment with a musical beat on the timeline. Upon performing an editing operation, the clip-beat aligner maintains that the boundary of the media segment is aligned with any one of the musical beats. To align the boundary of each media segment with a musical beat, the clip-beat aligner identifies a musical beat that is proximate to the position of the media segment's boundary. The clip-beat aligner then aligns the media segment's boundary with the proximate musical beat by, if necessary, automatically trimming the media segment's duration such that the media segment's boundary occurs at the same moment in time (i.e. simultaneously) as the proximate musical beat.

Figure 1:
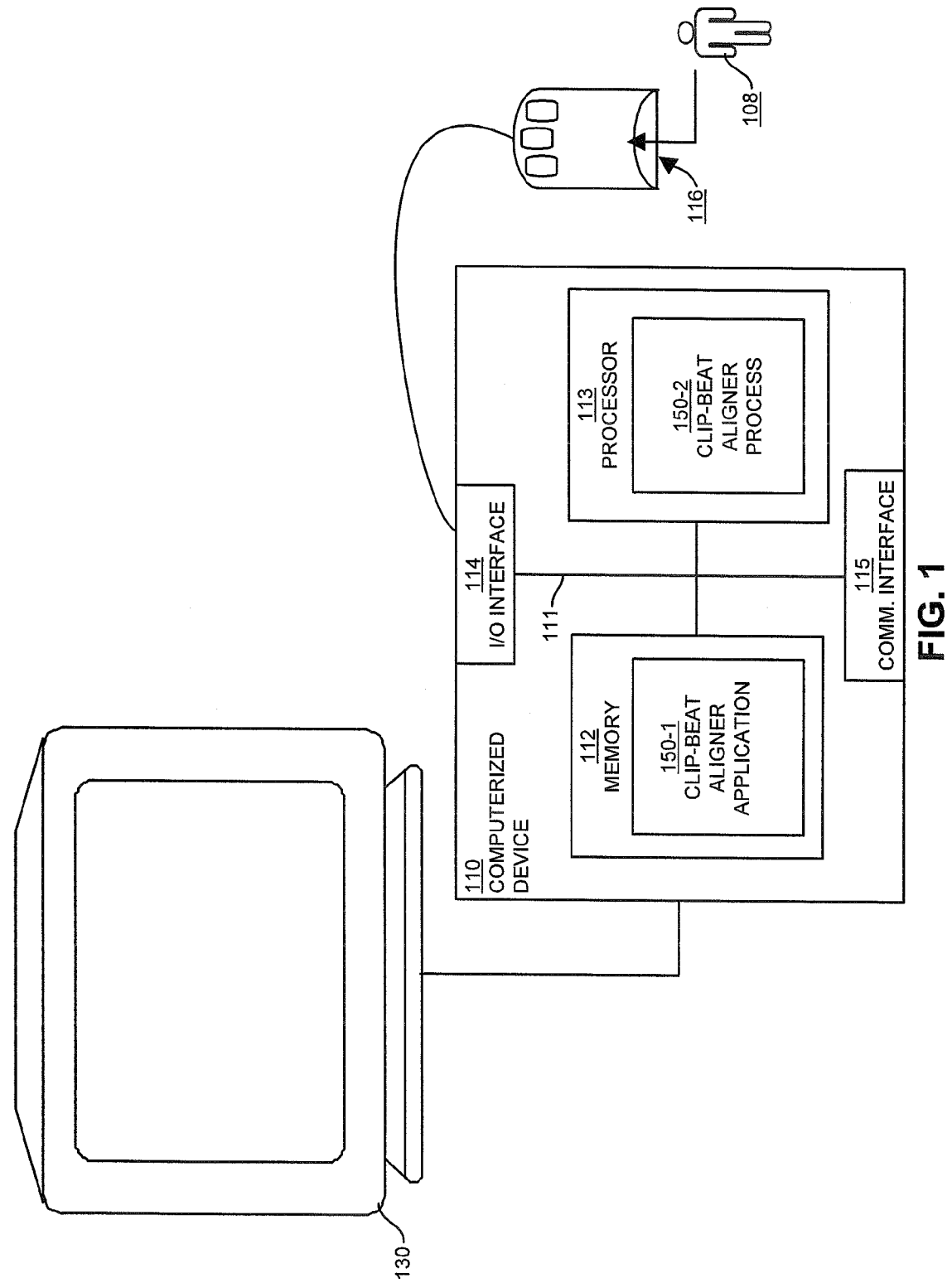
FIG. 1 is a block diagram of a computer system configured with a clip-beat aligner according to embodiments herein.

Turning now to FIG. 1, a block diagram illustrates an example of architecture for a computer system 110 that executes, runs, interprets, operates or otherwise performs a clip-beat aligner application 150-1 and/or clip-beat aligner process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the clip-beat aligner 150. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. Further, aspects of the clip-beat aligner application 150-1 and/or the clip-beat aligner process 150-2 can be distributed over a networked environment.

The memory system 112 can be any type of computer readable medium and, in this example, is encoded with a clip-beat aligner application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the clip-beat aligner application 150-1. Execution of the clip-beat aligner application 150-1 in this manner produces the clip-beat aligner process 150-2. In other words, the clip-beat aligner process 150-2 represents one or more portions or runtime instances of the clip-beat aligner application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the clip-beat aligner application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 to launch, run, execute, interpret or otherwise perform the logic instructions of the clip-beat aligner application 150-1. Execution of the clip-beat aligner application 150-1 in this manner produces processing functionality in a clip-beat aligner process 150-2. In other words, the clip-beat aligner process 150-2 represents one or more portions or runtime instances of the clip-beat aligner application 150-1 (or the entire targeted advertisement application 150-1) performing or executing within or upon the processor 113 in the computerized device 110 at runtime.

A number of flowcharts illustrating embodiments of the clip-beat aligner 150 are shown in FIGS. 3, 4, 7, 9 and 10. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present clip-beat aligner. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the clip-beat aligner. Thus, unless otherwise stated, the steps described below are unordered, meaning that, when possible, the steps may be performed in any convenient or desirable order.

Figure 2:
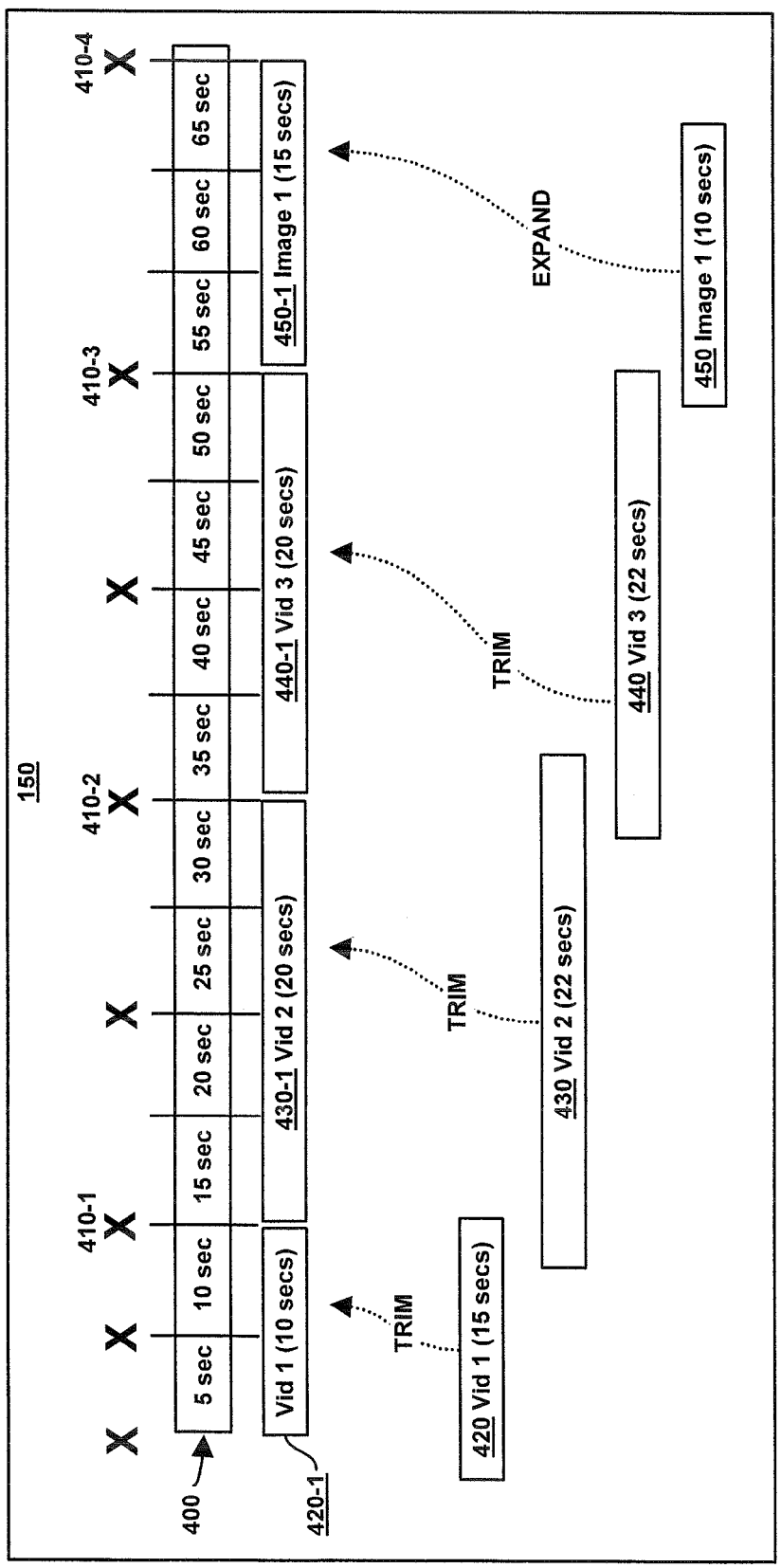
FIG. 2 is a block diagram of media segment boundaries that are trimmed and aligned to musical beats according to embodiments herein.

FIG. 2 is a block diagram of media segment boundaries that are trimmed and aligned to musical beats according to embodiments herein. FIG. 2 includes a timeline 400 to align musical beats (depicted as "X") with boundaries of video clips 420, 430, 440 and an image still 450.

As illustrated in FIG. 2, the musical beat 410-1 that occurs at 10 seconds into the timeline 400 is considered a proximate musical beat 410-1 for the boundary (i.e. the endpoint) of the first video clip 420. The first video clip's 420 proximate musical beat 410-1 is measured from the initial musical beat (at 0 seconds) because the first video clip 420 is the first media segment added to the video project's timeline 400. Since the first video clip 420 has a duration 15 seconds, the proximate musical beat 410-1 allows the most time for the content of the first video clip 420. Thus, the proximate musical beat 410-1 on the timeline 400 occurs at 10 seconds.

To align the boundary of the first video clip 420 with the proximate musical beat 410-1, the clip-beat aligner 150 trims 5 seconds of the first video clip's 420 original 15 second duration. After being trimmed, the first video clip 420-1 is now only 10 seconds long and can be placed on the timeline 400 to simultaneously occur with the proximate musical beat 410-1.

With regard to the second video clip 430, the musical beat 410-2 that occurs at 30 seconds into the timeline 400 is considered a proximate musical beat 410-2. The second video clip's 430 proximate musical beat 410-2 is measured from the end of the trimmed first video clip 420-1 on the timeline 400 (i.e. from where the second video clip 420-1 begins on the timeline). As measured from 10 seconds into the timeline 400, the second video clip's 430 endpoint occurs at the timeline's 400 32 second mark. Thus, the musical beat 410-2 at 30 seconds is the proximate musical beat 410-2. To align the second video clip's 430 boundary with the proximate musical beat 410-2, the clip-beat aligner 150 trims 2 seconds from the second video clip's 430 original 22 second duration. After being trimmed, the second video clip 430-1 is now only 20 seconds and can be aligned to simultaneously occur with the proximate musical beat 410-2.

Similar calculations used for the second video clip 430 occur with regard to trimming the third video clip 440 to ensure that the trimmed third video clip's 440-1 boundary occurs simultaneously with the proximate musical beat 410-3, which is measured from trimmed second video clip's 430-1 endpoint. In other words, the proximate musical beat 410-3 is located closest to, but not exceeding, the original (i.e. maximum) duration of the third video clip 440, as measured from that clip's position on the timeline.

For the image still 450, the clip-beat aligner 150 allows the image still 450 to be expanded such that the image still's 450 boundary occurs at the closest musical beat 410-4. The clip-beat aligner 150 measures for the closest musical beat 410-4 from 50 seconds into the timeline 400—where the image still 450 is placed. The closest musical beat 410-4 for the image still's 450 original duration of 10 seconds occurs at 65 seconds into the timeline. Thus, the boundary of the image still 450 reaches to the 60 second mark on the timeline 400, which is 5 seconds short of the closest musical beat 410-4. The clip-beat aligner 150 expands the duration of the image still 450 such that the end of the expanded image still 450-1 occurs simultaneously with the closest musical beat 410-4—at 65 seconds. It is understood that expanding the image still 450 can be performed by identifying the closest musical beat 410-4 according to a predefined default duration as opposed to the original duration of the image still 450.

Further, it is understood that in order to identify musical beats in the audio file, the clip-beat aligner 150 allows the user 108 to defining a decibel range and a particular amount of time. Therefore, a musical beat can be identified whenever there is an increase of volume throughout the audio file that occurs in the decibel range but within the defined amount of time.

Aspects of the clip-beat aligner 150 illustrated in FIG. 2 will further be discussed in relation to the FIG. 3. FIG. 3 is a flowchart 300 of processing steps performed by a clip-beat aligner 150 to align media segment boundaries to musical beats according to embodiments herein. At step 320, the clip-beat aligner 150 identifies a proximate musical beat that is closest to the position of each media segment's boundary (i.e. end point) on the timeline. In order to properly identify proximate musical beats for each media segment, at step 330, the clip-beat aligner 150 measures from an initial beat of the audio file, a preceding musical beat that is aligned another media segment's boundary that occurs at an earlier position on the time, or from the beginning of the media segment that needs to be aligned to a musical beat. Thus, in other words, the proximate musical beat is located closest to but not exceeding a maximum duration (or a trimmed duration) of the media segment as measured from its position on the timeline at which the media segment begins. For the image still, the proximate musical beat can be located closest to a default duration for the image still as measured from its position on the timeline at which the image still begins.

At step 340, the clip-beat aligner 150 aligns the media segment's boundary to the proximate musical beat by automatically trimming the media segment's duration. The trimmed duration results in the media segment boundary occurring simultaneously with the proximate musical beat on the timeline.

Figure 4:
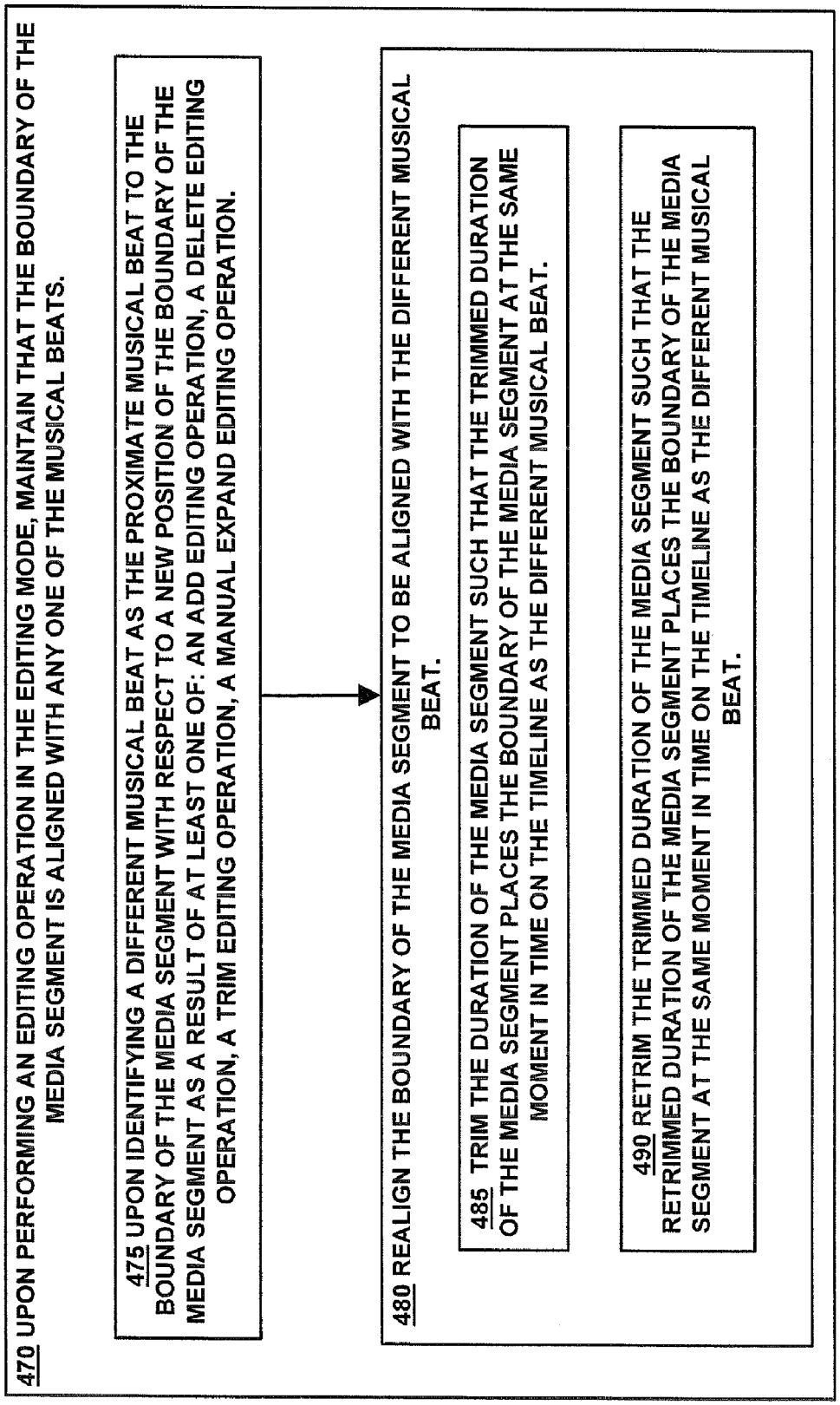
FIG. 4 is a flowchart of processing steps performed by a clip-beat aligner to maintain an alignment of the boundary of a media segment with any musical beat upon performing the editing operation in the editing mode according to embodiments herein.

FIG. 4 is a flowchart 465 of processing steps performed by a clip-beat aligner 450 to maintain an alignment of the boundary of a media segment with any musical beat upon performing an editing operation in the editing mode according to embodiments herein. At step 475, as a result of an add editing operation, a delete editing operation, a trim editing operation, and/or a manual expand editing operation, the clip-beat aligner 150 identifies a different musical beat as the proximate musical beat to the media segment's boundary with respect to a new position of the media segment's boundary.

At step 480, the clip-beat aligner 150 realigns the boundary with the different musical beat. In order to realign the boundary at step 485, the clip-beat aligner 150 trims the media segment's duration to place the boundary at the same moment in time on the timeline as the different musical beat. In the alternative, at step 490, the clip-beat aligner 150 retrims the trimmed duration of the media segment such that the retrimmed duration places the boundary at the same moment in time on the timeline as the different musical beat.

Figure 5:
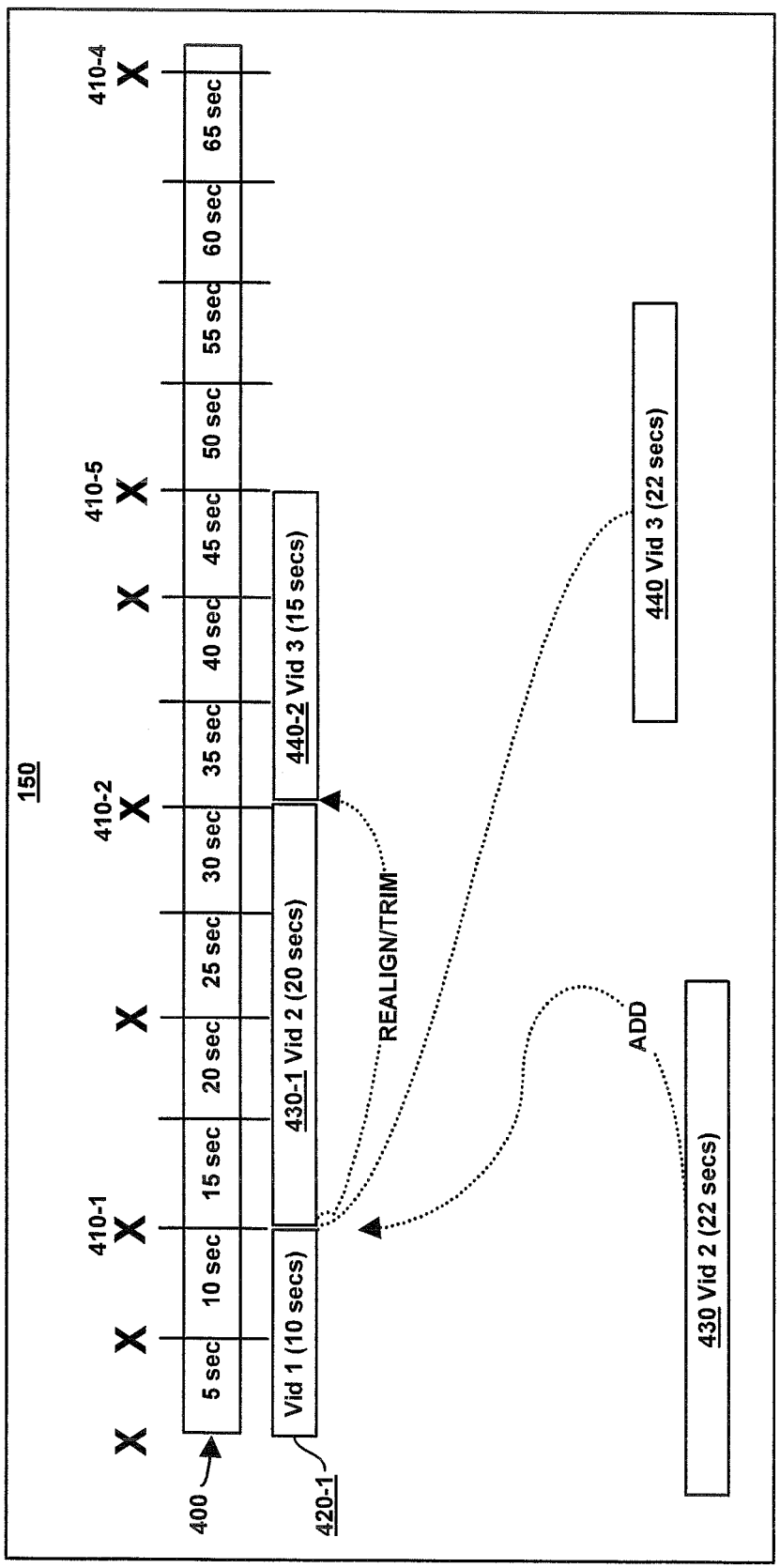
FIG. 5 is a block diagram of media segment boundaries that are trimmed and aligned to musical beats in response to adding a media segment to a timeline according to embodiments herein.

With regard to the processing steps of FIG. 4, FIG. 5 is a block diagram of media segment boundaries that are trimmed and aligned to musical beats in response to adding a media segment to a timeline according to embodiments herein. In FIG. 5, the clip-beat aligner 150 allows a video editor to create a video clip sequence on the timeline 400 with the "Vid 3" video clip 440 playing after the "Vid 1" video clip 420-1. However, upon adding the "Vid 2" video clip 430 on the timeline 400 at the 10 second mark, the "Vid 2" video clip 430 is trimmed to align with the proximate musical beat 410-2 at 30 seconds. The insertion of the trimmed "Vid 2" video clip 430-1 into the timeline shifts the position of the "Vid 3" video clip 440. Thus, the "Vid 3" video clip 440 will be aligned with a different musical beat due to its change in position on the timeline 400 (i.e. in response to adding video clip 430-1).

Measuring from the end of the trimmed "Vid 2" video clip 430-1, the clip-beat aligner 150 identifies a different musical beat 410-5 to align with the end of the "Vid 3" video clip 440. The clip-beat aligner 150 retrims the "Vid 3" video clip's 440-2 duration from 20 seconds to 15 seconds, thereby realigning the trimmed "Vid 3" video clip 440-2 to the 45 second musical beat 410-5.

Figure 6:
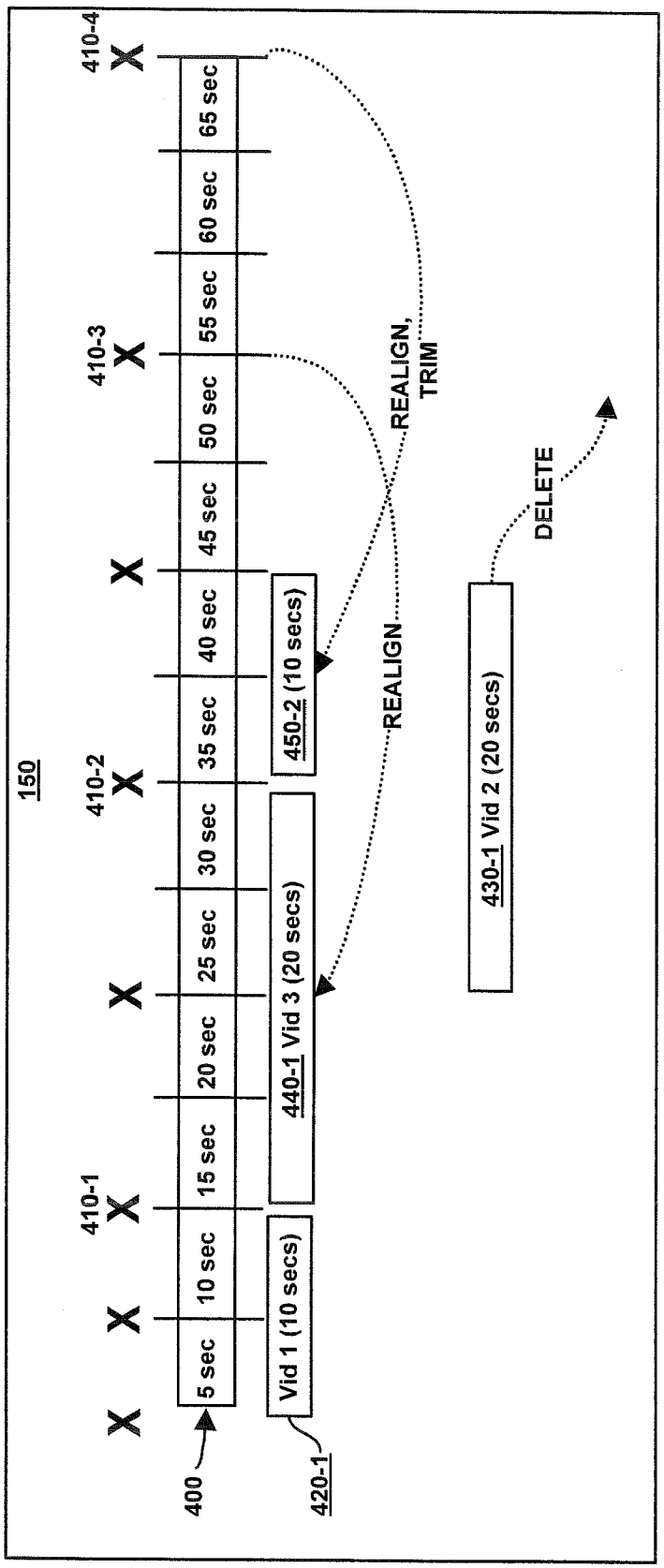
FIG. 6 is a block diagram of media segment boundaries that are trimmed and aligned to musical beats in response to deleting a media segment from a timeline according to embodiments herein.

FIG. 6 is a block diagram of media segment boundaries that are trimmed and aligned to musical beats in response to deleting a media segment from a timeline according to embodiments herein. As depicted in FIG. 6, the "Vid 2" video clip 430-1 is being deleted from the timeline 400. Since the sequence of video clips on the timeline has been altered, the clip-beat aligner 150 must realign the remaining video clips 420-1, 440-1, 450-2, such that each remaining video clip occurs simultaneously with a musical beat. For example, the position of the "Vid 3" video clip 440-1 is shifted to an earlier position in time on the timeline 400. Since the "Vid 3" video clip 440-1 has been shifted, it will be aligned with a different musical beat 410-2. The clip-beat aligner 150 measures for the different musical beat 410-2 from the end of the "Vid 1" video clip 420-1, which occurs at 10 seconds into the timeline 400. The clip-beat aligner 150 identifies the different musical beat 410-2 at 30 seconds, which allows the "Vid 3" video clip 440-1 to be aligned without any retrimming. As the "Vid 3" video clip 440-1 is realigned to occur simultaneously with the different musical beat 410-2, image still 450-2 will be trimmed and realigned to occur simultaneously with a different musical beat (at 40 seconds on the timeline 400) as well.

Figure 7:
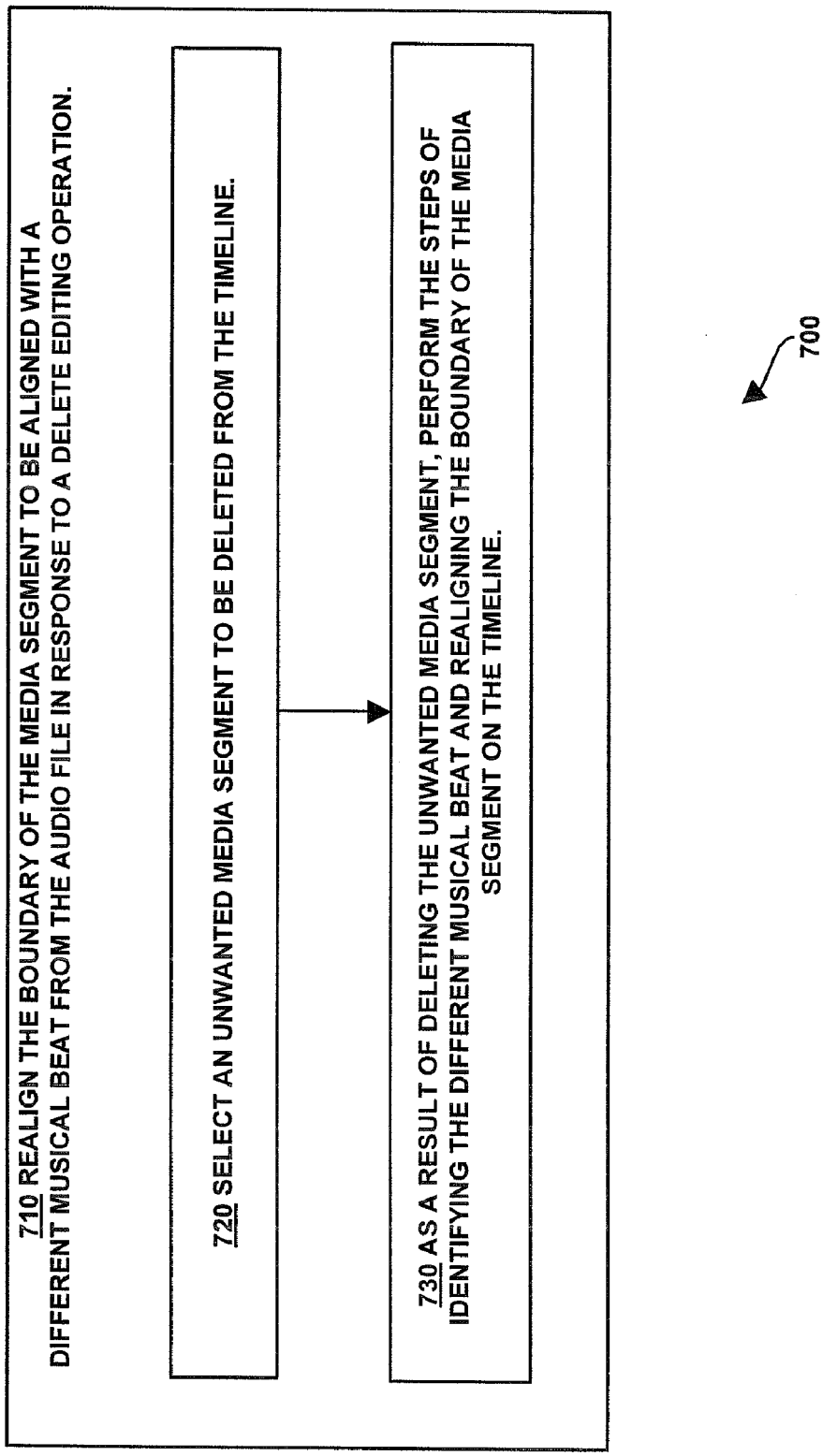
FIG. 7 is a flowchart of processing steps performed by a clip-beat aligner to perform a delete operation according to embodiments herein.

FIG. 7 is a flowchart 700 of processing steps performed by a clip-beat aligner to perform a delete operation according to embodiments herein. The processing steps of flowchart 700 relate to the aspects of the clip-beat aligner 150 illustrated in FIG. 6. At step 720, the clip-beat aligner 150 selects an unwanted media segment to be deleted from the timeline. At step 730, as a result of deleting the unwanted media segment, the clip-beat aligner 150 performs the steps of identifying the different musical beat and realigning the boundary of the media segment on the timeline.

Figure 8:
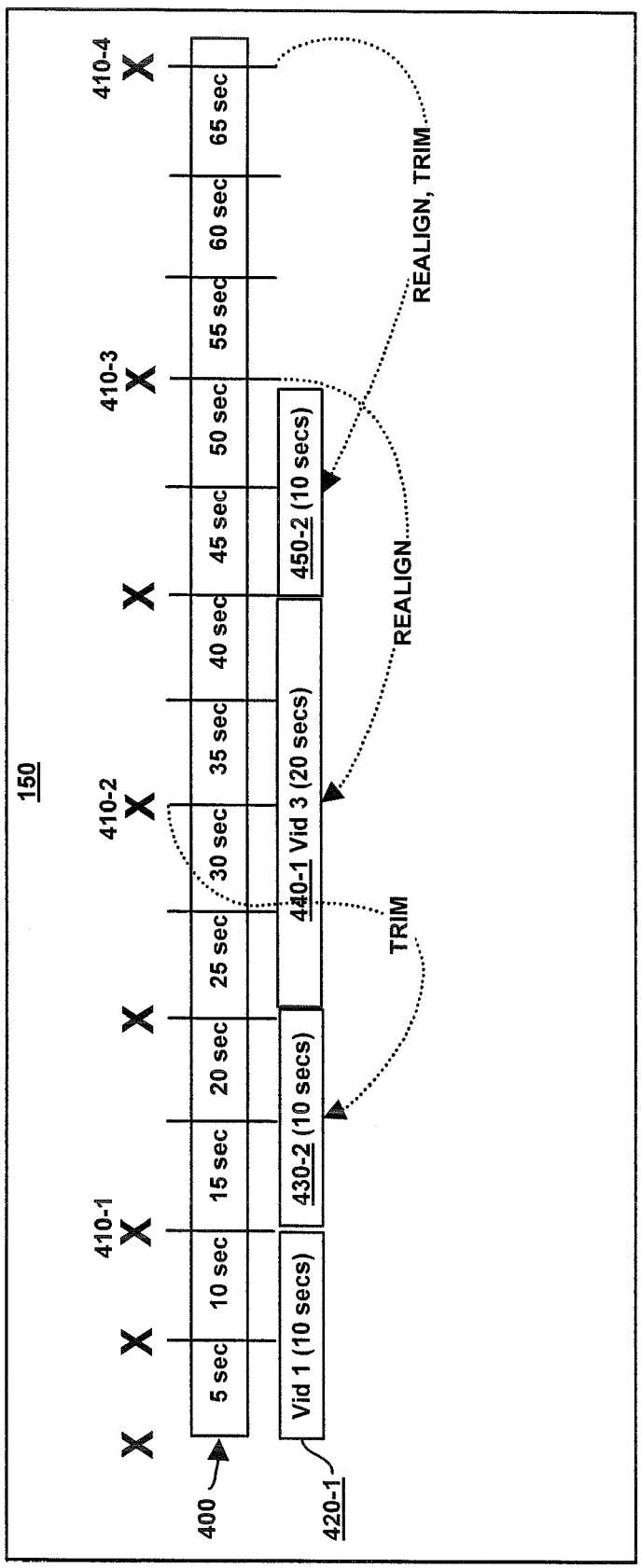
FIG. 8 is a block diagram of media segment boundaries that are trimmed and aligned to musical beats in response to trimming a media segment on a timeline according to embodiments herein.

FIG. 8 is a block diagram of media segment boundaries that are trimmed and aligned to musical beats in response to trimming a media segment on a timeline according to embodiments herein. As depicted in FIG. 8, a video clip 430-2 is trimmed from 20 seconds to 10 seconds on the timeline 400, thereby placing the video clip's 430-2 boundary at a musical beat that occurs 20 seconds into the timeline 400. Due to the trimming operation performed on the video clip 430-2, the "Vid 3" video clip 440-1 will be placed at a new position on the timeline 400. The "Vid 3" video clip 440-1 will be realigned with a different musical beat. Measuring from the end of the trimmed video clip 430-2, at 20 seconds in the timeline 400, the clip-beat aligner 150 identifies the different musical beat at 40 seconds. No trimming of the "Vid 3" video clip 440-1 is required because its duration of 20 seconds allows for its boundary to align with the different musical beat at 40 seconds. However, image still 450-2 is trimmed as it is realigned with the musical beat 410-3 at 50 seconds into the timeline 400.

Figure 9:
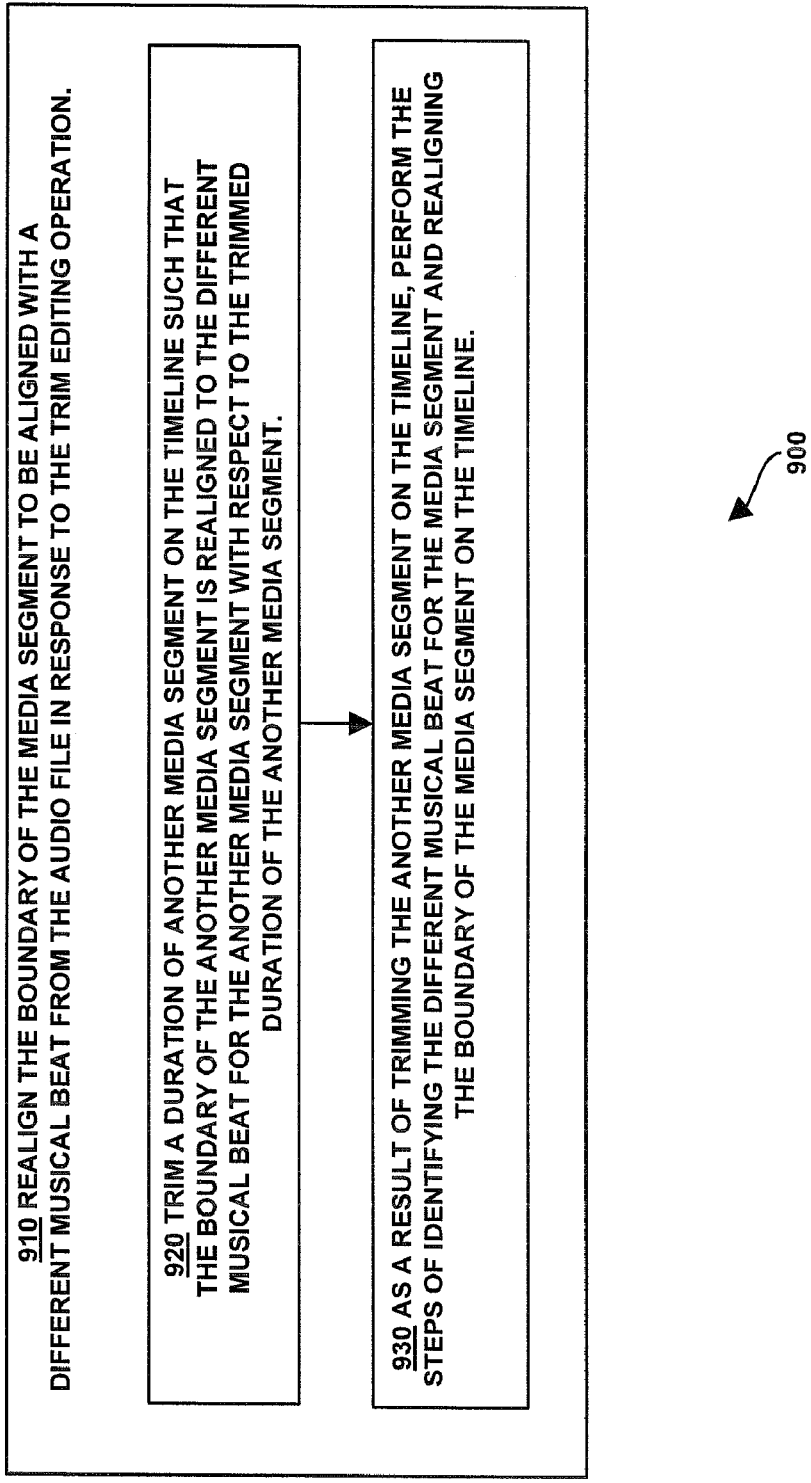
FIG. 9 is a flowchart of processing steps performed by a clip-beat aligner to perform a trim operation according to embodiments herein.

FIG. 9 is a flowchart 900 of processing steps performed by a clip-beat aligner to perform a trim operation according to embodiments herein. The processing steps of flowchart 900 relate to the aspects of the clip-beat aligner 150 illustrated in FIG. 8. At step 920, the clip-beat aligner 150 trims a duration of a media segment on the timeline such that the boundary of the trimmed media segment is realigned to a different musical beat. At step 930, as a result of trimming the media segment on the timeline, the clip-beat aligner performs the steps of identifying different musical beats for any media segment on the timeline and realigns the boundaries of all other media segments on the timeline 400 with different musical beats.

Figure 10:
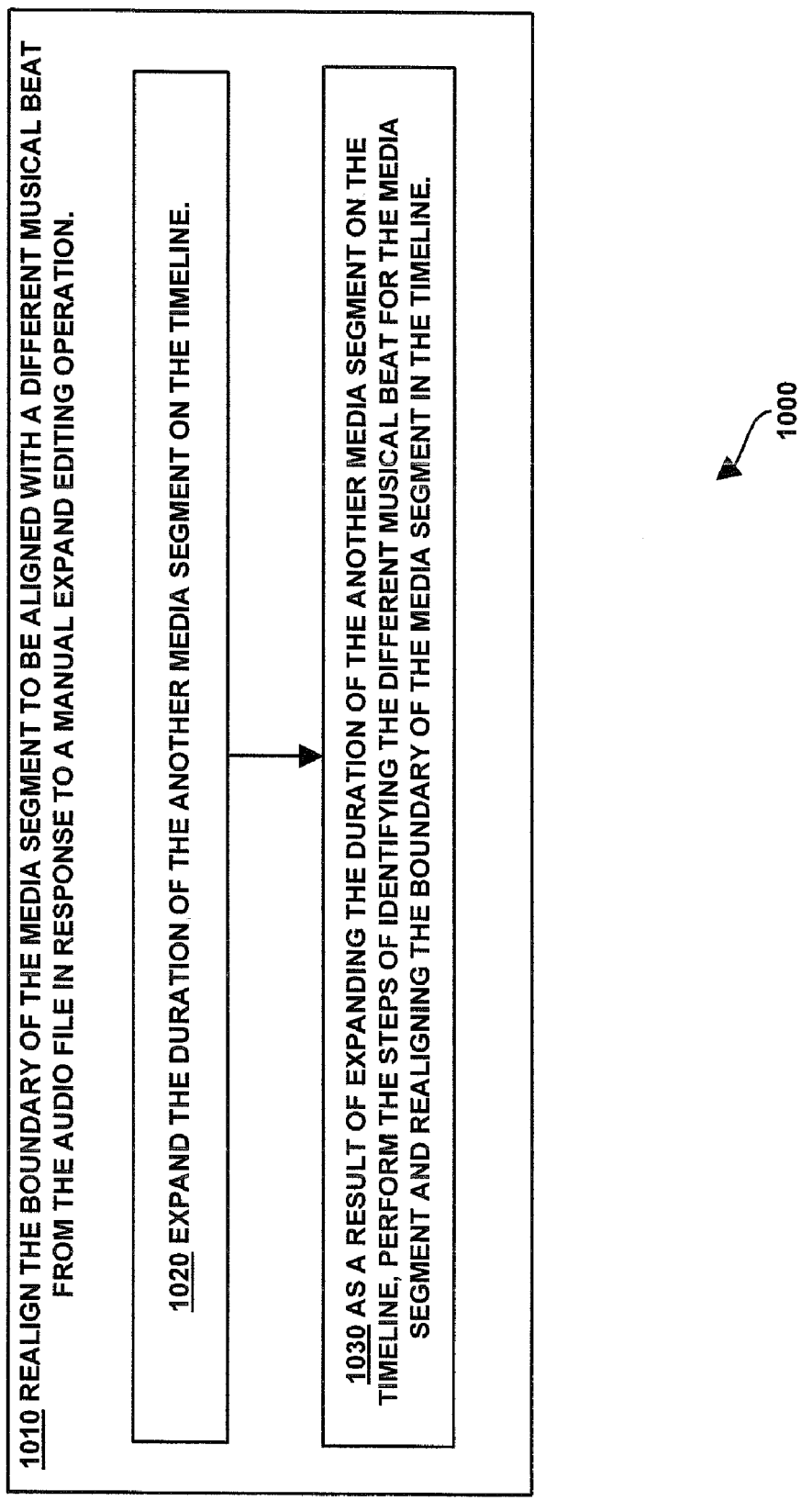
FIG. 10 is a flowchart of processing steps performed by a clip-beat aligner to perform an expand operation according to embodiments herein.

FIG. 10 is a flowchart 1100 of processing steps performed by a clip-beat aligner to perform an expand operation according to embodiments herein. At step 1020, the clip-beat aligner 150 can allow a user to expand (i.e. lengthen) the duration of a media segment on the timeline. At step 1030, as a result of expanding the duration of the media segment on the timeline, the clip-beat aligner 150 performs the steps of identifying the different musical beat for media segments on the timeline and realigning the boundaries of those media segments. Thus, as with the adding, deleting and trimming media segments on the timeline 400, media segment boundaries can be trimmed and realigned when the duration of particular media segment has been increased.

It is noted that example configurations disclosed herein include the clip-beat aligner application 150-1 itself (i.e., in the form of un-executed or non-performing logic instructions and/or data). The clip-beat aligner application 150-1 may be stored on a computer readable medium (such as a floppy disk), hard disk, electronic, magnetic, optical, or other computer readable medium.

Note again that techniques herein are well suited for a clip-beat aligner 150 that allows for recording events that occur during media content consumption, verifying the authenticity of such recorded events (i.e. user interactions, user decisions, user activities), as well as transmitting the authenticated, recorded events to a media publisher. However, it should be noted that embodiments herein are not limited to use in such applications and that the techniques discussed herein are well suited for other applications as well.

Other arrangements of embodiments of the clip-beat aligner that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an extensible master-slave user interface with distinct interaction models as explained herein. The computer program logic, when executed on at least one processor with a computing system, causes the processor to perform the operations (e.g., the methods) indicated herein as embodiments of the clip-beat aligner. Such arrangements of the clip-beat aligner are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the clip-beat aligner. Software processes that operate in a collection of computerized devices, such as in a group of data communications devices or other entities can also provide the system of the clip-beat aligner. The system of the clip-beat aligner can be distributed between many software processes on several data communications devices, or all processes could run on a small set of dedicated computers, or on one computer alone.

While this clip-beat aligner has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the clip-beat aligner are presented in the following claims.

What is claimed is:

1. A computer-implemented method in which at least one computer system accesses instructions from computer storage and executes the instructions to perform steps of:
    identifying at least one musical beat in an audio file;
    providing an editing mode to associate the audio file with a media segment according to a timeline;
    upon performing at least one editing operation in the editing mode, maintaining that the boundary of the media segment is in alignment with any one of the musical beats, the media segment comprising one of an image still and a video clip, the boundary defining an end of the media segment;
    wherein the editing mode aligns the boundary with one of the identified musical beats on the timeline by identifying a proximate musical beat closest to a position of the boundary on the timeline, the proximate musical beat comprising one of:
    (i) a first musical beat located at a position on the timeline closest to but not exceeding the media segment's maximum duration measured from a position on the timeline at which the media segment begins;
    (ii) for a trimmed media segment, a second musical beat located closest to but not exceeding the trimmed media segment's duration as measured from a position on the timeline at which the trimmed media segment begins;
    (iii) when the media segment comprises an image still, a third musical beat closest to the image still's default duration as measured from a position on the timeline at which the image still begins; and
    aligning the boundary to the proximate musical beat by automatically trimming the media segment's current duration to create a trimmed duration for the media segment, wherein trimming results in a new boundary for the media segment occurring simultaneously with the proximate musical beat on the timeline.

2. The computer-implemented method of claim 1, wherein identifying one or more musical beats in the audio file includes:
    defining a decibel range;
    defining an amount of time;
    identifying at least one increase of volume throughout the audio file that occurs in the decibel range within the amount of time; and
    identifying a position on the timeline for an occurrence of each identified increase of volume.

3. The computer-implemented method as in claim 1, wherein identifying the proximate musical beat from the identified musical beats in the audio file includes:
    where the media segment is the image still, the step of identifying the proximate musical beat further includes measuring from a boundary of the image still to a closest musical beat that occurs after the boundary of the image still on the timeline; and expanding a duration of the image still such that a boundary of the expanded image still occurs simultaneously with the closest musical beat.

4. The computer-implemented method as in claim 1, wherein upon performing the editing operation in the editing mode, maintaining the boundary of the media segment is aligned with any one of the musical beats includes:
   upon identifying a different musical beat as the proximate musical beat to the boundary of the media segment with respect to a new position of the boundary of the media segment as a result of at least one:
      (i) an add editing operation;
      (ii) a delete editing operation;
      (iii) a trim editing operation;
      (iv) a manual expand editing operation; and
   realigning the boundary of the media segment to be aligned with the different musical beat.

5. The computer-implemented method as in claim 4, wherein realigning the boundary of the media segment to be aligned with the different musical beat includes one of the following:
   trimming the duration of the media segment such that the trimmed duration of the media segment places the boundary of the media segment at the same moment in time on the timeline as the different musical beat; and
   retrimming the trimmed duration of the media segment such that the retrimmed duration of the media segment places the boundary of the media segment at the same moment in time on the timeline as the different musical beat.

6. The computer-implemented method as in claim 4, wherein realigning the boundary of the media segment to be aligned with a different musical beat from the audio file in response to the add editing operation includes:
   placing a new media segment on the timeline and aligning a boundary of the new media segment to the proximate musical beat for the boundary of the new media segment, where the proximate musical beat for the boundary of the new media segment is measured from a position on the timeline of a beginning of the new media segment, and wherein aligning of the boundary of the new media segment includes the step of any necessary trimming of a duration of the new media segment; and
   performing the steps of identifying the different musical beat and realigning the boundary of the media segment on the timeline as a result of adding the new media segment.

7. The computer-implemented method as in claim 4, wherein realigning the boundary of the media segment to be aligned with a different musical beat from the audio file in response to the delete editing operation includes:
   selecting an unwanted media segment to be deleted from the timeline; and
   as a result of deleting the unwanted media segment, performing the steps of identifying the different musical beat and realigning the boundary of the media segment on the timeline.

8. The computer-implemented method as in claim 4, wherein realigning the boundary of the media segment to be aligned with a different musical beat from the audio file in response to the trim editing operation includes:
   trimming a duration of another media segment on the timeline such that the boundary of the another media segment is realigned to the different musical beat for the another media segment with respect to the trimmed duration of the another media segment; and
   as a result of trimming the another media segment on the timeline, performing the steps of identifying the different musical beat for the media segment and realigning the boundary of the media segment on the timeline.

9. The computer-implemented method as in claim 4, wherein realigning the boundary of the media segment to be aligned with a different musical beat from the audio file in response to the manual expand editing operation includes:
   expanding the duration of the another media segment on the timeline; and
   as a result of expanding the duration of the another media segment on the timeline, performing the steps of identifying the different musical beat for the media segment and realigning the boundary of the media segment in the timeline.

10. A computer readable storage medium comprising executable instructions encoded thereon operable on a computerized device to perform clip-beat aligner processing comprising:
   instructions for identifying at least one musical beat in an audio file;
   instructions for providing an editing mode to associate the audio file with a media segment according to a timeline, the editing mode aligning a boundary of the media segment with one of the musical beats on the timeline; and
   instructions for maintaining the boundary of the media segment is in alignment with any one of the musical beats upon performing at least one editing operation in the editing mode, the media segment comprising one of an image still and a video clip, the boundary defining an end of the media segment;
   wherein instructions for providing the editing mode include instructions to align the boundary with one of the identified musical beats on the timeline by identifying a proximate musical beat closest to a position of the boundary on the timeline, the proximate musical beat comprising one of:
   (i) a first musical beat located at a position on the timeline closest to but not exceeding the media segment's maximum duration measured from a position on the timeline at which the media segment begins;
   (ii) for a trimmed media segment, a second musical beat located closest to but not exceeding the trimmed media segment's duration as measured from a position on the timeline at which the trimmed media segment begins;
   (iii) when the media segment comprises an image still, a third musical beat closest to the image still's default duration as measured from a position on the timeline at which the image still begins; and
   aligning the boundary to the proximate musical beat by automatically trimming the media segment's current duration to create a trimmed duration for the media segment, wherein trimming results in a new boundary for the media segment occurring simultaneously with the proximate musical beat on the timeline.

11. The computer readable storage medium as in claim 10, wherein the instructions for identifying the proximate musical beat, from the identified musical beats in the audio file include:
   where the media segment is the image still, the step of identifying the proximate musical beat further includes instructions for measuring from a boundary of the image still to a closest musical beat that occurs after the boundary of the image still on the timeline; and
   instructions for expanding a duration of the image still such that a boundary of the expanded image still occurs simultaneously with the closest musical beat.

12. The computer readable storage medium as in claim 10, wherein upon performing the editing operation in the editing mode, the instructions for maintaining the boundary of the media segment is aligned with any one of the musical beats include:
   upon identifying a different musical beat as the proximate musical beat to the boundary of the media segment with respect to a new position of the boundary of the media segment as a result of at least one:
      (i) an add editing operation;
      (ii) a delete editing operation;
      (iii) a trim editing operation;
      (iv) a manual expand editing operation; and
   instructions for realigning the boundary of the media segment to be aligned with the different musical beat.

13. The computer readable storage medium as in claim 12, wherein the instructions for realigning the boundary of the media segment to be aligned with the different musical beat includes one of the following:
   (i) instructions for trimming the duration of the media segment such that the trimmed duration of the media segment places the boundary of the media segment at the same moment in time on the timeline as the different musical beat; and
   (ii) instructions for retrimming the trimmed duration of the media segment such that the retrimmed duration of the media segment places the boundary of the media segment at the same moment in time on the timeline as the different musical beat.

14. The computer readable storage medium as in claim 12, wherein the instructions for realigning the boundary of the media segment to be aligned with a different musical beat from the audio file in response to the add editing operation include:
   instructions for placing a new media segment on the timeline and aligning a boundary of the new media segment to the proximate musical beat for the boundary of the new media segment, where the proximate musical beat for the boundary of the new media segment is measured from a position on the timeline of a beginning of the new media segment, and wherein the instructions for aligning of the boundary of the new media segment includes the step of any necessary trimming of a duration of the new media segment; and
   the instructions for performing the steps of identifying the different musical beat and realigning the boundary of the media segment on the timeline as a result of adding the new media segment.

15. The computer readable storage medium as in claim 12, wherein the instructions for realigning the boundary of the media segment to be aligned with a different musical beat from the audio file in response to the delete editing operation include:
   instructions for selecting an unwanted media segment to be deleted from the timeline; and
   as a result of deleting the unwanted media segment, instructions for performing the steps of identifying the different musical beat and realigning the boundary of the media segment on the timeline.

16. The computer readable storage medium as in claim 12, wherein the instructions for realigning the boundary of the media segment to be aligned with a different musical beat from the audio file in response to the trim editing operation include:
   instructions for trimming a duration of another media segment on the timeline such that the boundary of the another media segment is realigned to the different musical beat for the another media segment with respect to the trimmed duration of the another media segment; and
   as a result of trimming the another media segment on the timeline, instructions for performing the steps of identifying the different musical beat for the media segment and realigning the boundary of the media segment on the timeline.

17. The computer readable storage medium as in claim 12, wherein the instructions for realigning the boundary of the media segment to be aligned with a different musical beat from the audio file in response to the manual expand editing operation include:
   instructions for expanding the duration of the another media segment on the timeline; and
   as a result of expanding the duration of the another media segment on the timeline, instructions for performing the steps of identifying the different musical beat for the media segment and realigning the boundary of the media segment in the timeline.

18. A computer system comprising:
   a processor;
   a memory unit that stores instructions associated with an application executed by the processor; and
   an interconnect coupling the processor and the memory unit, enabling the computer system to execute the application and perform operations of:
   identifying at least one musical beat in an audio file;
   providing an editing mode to associate the audio file with a media segment according to a timeline, the editing mode aligning a boundary of the media segment with one of the musical beats on the timeline; and
   upon performing at least one editing operation in the editing mode, maintaining the boundary of the media segment is in alignment with any one of the musical beats, the media segment comp sing one of an image still and a video clip, the boundary defining an end of the media segment; wherein the editing mode aligns the boundary with one of the identified musical beats on the timeline by identifying a proximate musical beat closest to a position of the boundary on the timeline, the proximate musical beat comprising one of:
   (i) a first musical beat located at a position on the timeline closest to but not exceeding the media segment's maximum duration measured from a position on the timeline at which the media segment begins;
   (ii) for a trimmed media segment, a second musical beat located closest to but not exceeding the trimmed media segment's duration as measured from a position on the timeline at which the trimmed media segment begins;
   (iii) when the media segment comprises an image still, a third musical beat closest to the image still's default duration as measured from a position on the timeline at which the image still begins; and
   aligning the boundary to the proximate musical beat by automatically trimming the media segment's current duration to create a trimmed duration for the media segment, wherein trimming results in a new boundary for the media segment occurring simultaneously with the proximate musical beat on the timeline.

* * * * *

UNITED STATES PATENT AND TRADEMARK OFFICE
CERTIFICATE OF CORRECTION

PATENT NO. : 7,569,761 B1
APPLICATION NO. : 11/859141
DATED : August 4, 2009
INVENTOR(S) : Michael Iampietro et al.

It is certified that error appears in the above-identified patent and that said Letters Patent is hereby corrected as shown below:

Claim 18, Column 14, Line 39, "comp sing" should read --comprising--.

Signed and Sealed this

Twenty-second Day of December, 2009

David J. Kappos
*Director of the United States Patent and Trademark Office*